J. K. STEWART.
SPEEDOMETER DRIVE GEAR.
APPLICATION FILED JAN. 18, 1913.
1,058,805. Patented Apr. 15, 1913.
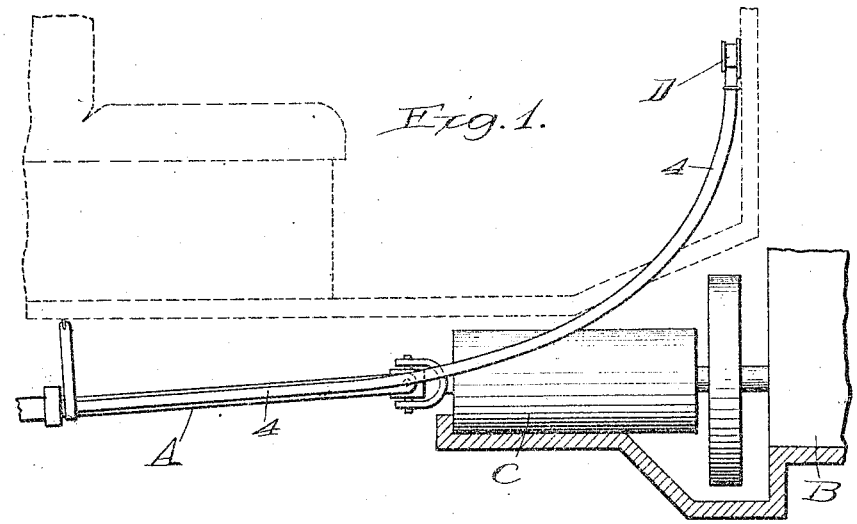
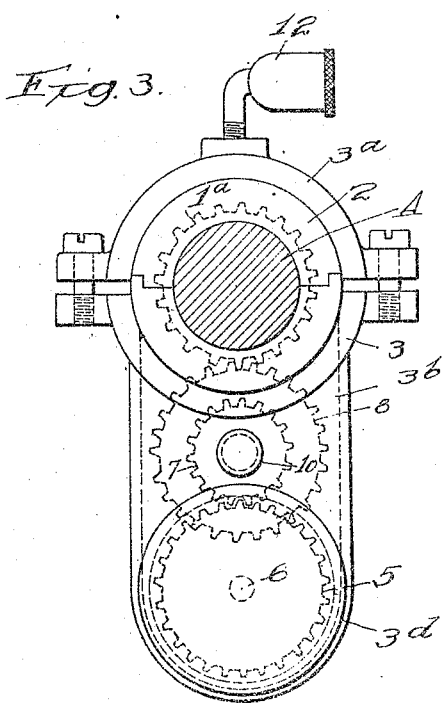
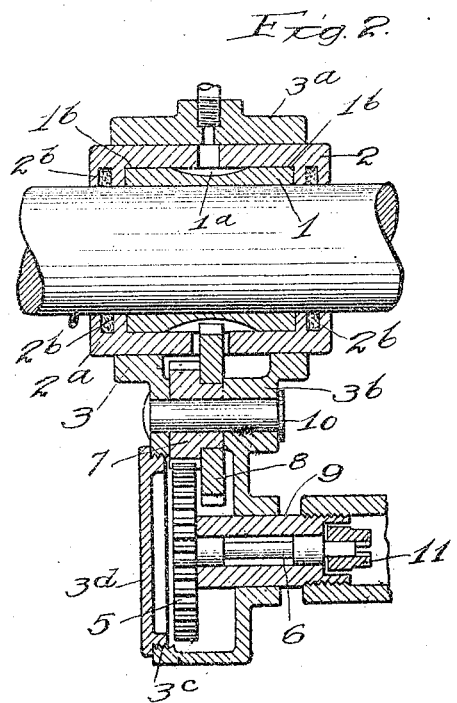
Witnesses:
Inventor:
John K. Stewart.

UNITED STATES PATENT OFFICE.

JOHN K. STEWART, OF CHICAGO, ILLINOIS.

SPEEDOMETER DRIVE-GEAR.

1,058,805.  Specification of Letters Patent.  Patented Apr. 15, 1913.

Application filed January 18, 1913. Serial No. 742,780.

*To all whom it may concern:*

Be it known that I, JOHN K. STEWART, a citizen of the United States, residing at Chicago, in the county of Cook and State of Illinois, have invented new and useful Improvements in Speedometer Drive-Gear, of which the following is a specification, reference being had to the accompanying drawings, forming a part thereof.

The purpose of this invention is to provide an improved drive connection for speedometers when used on automobiles or similarly constructed vehicles.

It consists of the features and elements described and shown in the drawings as indicated in the claims.

In the drawings:—Figure 1 is a side elevation showing the mode of installation on an automobile of the speedometer drive embodying this invention. Fig. 2 is a medial section of the drive gear and its hanger. Fig. 3 is an elevation of the hanger looking in the direction of the propeller shaft axis.

In Fig. 1, A, indicates the propeller drive shaft which is now almost universally employed as an element of the power transmission of an automobile, the position of the motor and change gear being indicated at, B and C, respectively.

It is the object of this invention to provide a suitable form of gearing for connecting the speedometer, D, which is to measure the speed of the car directly to the propeller shaft, A, instead of to one of the road wheels, as is more commonly done.

Referring now to Fig. 2, there is provided a sleeve, 1, whose interior diameter is a drive fit for the propeller shaft, A, and which has gear teeth milled in its outer cylindrical surface intermediate its ends at 1ª. The sleeve, 1, having been properly positioned on the shaft, A, is inclosed by a split box, 2, of suitable metal to serve as a bearing, and bored to engage the sleeve for this purpose at its cylindrical end portions, 1ᵇ. The box, 2, is further provided with inwardly extending flanges, 2ª, at its ends, bored to the diameter of the propeller shaft, A, and thus adapted to stop the box against the ends of the sleeve, 1. Preferably these flanges, 2ª, are grooved at, 2ᵇ, to receive packing suitable to prevent leakage of lubricant from the bearing. The split box, 2, is held in position by a split hanger, 3, comprising a cap, 3ª, and casing, 3ᵇ, in which is mounted the gear train connecting the propeller shaft gear, 1, with the jointed shaft, 4, which leads to the speedometer, D. As shown, this train comprises a gear, 5, fixed on a shaft, 6, which is operatively clutched with the jointed shaft, 4, and an intermediate pinion, 7, and gear, 8, which are rigidly secured together and positioned to mesh, respectively, with the gear, 5, and propeller shaft gear, 1. With the gears of the train proportioned as shown, they will transmit the rotation of the propeller shaft, A, to the jointed shaft, 4, at a reduced speed, and it is obvious that any desired ratio may be obtained by properly proportioning the gears of this train. To simplify the construction and to permit of easy assembling, the case, 3ᵇ, is formed with a circular opening large enough to admit the gear, 5, and the bearing sleeve, 9, for the shaft, 6, is made a drive fit in the opposite side of the casing.

In assembling, the pinion, 7, and gear, 8, having been secured together, are entered through the opening, 3ᶜ, and positioned by the insertion of their axle, 10, which is then riveted in place. The sleeve, 9, is then driven into position and the gear, 5, with its shaft, 6, is introduced through the opening, 3ᶜ, being secured in position by a clutch member, 11, driven on to the other end of the shaft, 6. The opening, 3ᶜ, may then be closed by the cover plate, 3ᵈ, and the casing is rendered oil-tight so that the gears may at all times run in a bath of lubricant. If desired, the cap, 3ª, may be fitted with a grease cup, 12, through which additional lubricant can be supplied.

I claim:—

1. In combination with a rotating shaft and a speedometer, a cylindrical sleeve fixed on said shaft having gear teeth formed in its surface intermediate its ends, a hanger and a train of gears carried thereby connecting the gear of the sleeve with the speedometer, said hanger being provided with bearings which engage the end portions of the sleeve.

2. In combination with a rotating shaft and a speedometer, a cylindrical sleeve fixed on said shaft having gear teeth formed in its surface intermediate its ends, a hanger, and a train of gears carried thereby connecting the gear of the sleeve with the speedometer, said hanger being provided with bearings which engage the end portions of the sleeve, and said bearings having inwardly projecting flanges engaging the ends of the sleeve for stopping the hanger against movement in the direction of the shaft axis.

3. In combination with a rotating shaft and a speedometer, a cylindrical sleeve fixed on said shaft having gear teeth formed in its surface intermediate its ends, a hanger, and a train of gears carried thereby connecting the gear of the sleeve with the speedometer, said hanger being provided with bearings which engage the end portions of the sleeve, and said bearings having inwardly projecting flanges engaging the ends of the sleeve for stopping the hanger against movement in the direction of the shaft axis, the cylindrical faces of said flanges which oppose the surface of the shaft being grooved to receive packing.

4. In combination with a rotating shaft and a speedometer, a cylindrical sleeve fixed on said shaft having gear teeth formed in its surface intermediate its ends, a hanger, and a train of gears carried thereby connecting the gear of the sleeve with the speedometer, said hanger being separable at a plane parallel to the shaft axis and being lined with bearing material adapted to engage the end portions of the sleeve.

5. In combination with a rotating shaft and a speedometer, a cylindrical sleeve fixed on said shaft having gear teeth formed in its surface intermediate its ends, a hanger, a train of gears carried thereby connecting the gear of the sleeve with the speedometer, said hanger being separable at a plane parallel to the shaft axis, and a split bearing bored to engage the end portions of the sleeve and exteriorly dimensioned to be clamped between the two members of the hanger.

6. In combination with a rotating shaft and a speedometer, a cylindrical sleeve fixed on said shaft having gear teeth formed in its surface intermediate its ends, a hanger, a train of gears carried thereby connecting the gear of the sleeve with the speedometer, said hanger being separable at a plane parallel to the shaft axis, and a split bearing bored to engage the end portions of the sleeve and exteriorly dimensioned to be clamped between the two members of the hanger, said split bearing being provided with inwardly projecting flanges at both ends positioned to engage the ends of the sleeve for stopping the hanger against movement in the direction of the shaft axis.

In testimony whereof I have hereunto set my hand at Chicago, Illinois, this 2nd day of January, 1913.

JOHN K. STEWART.

Witnesses:
C. B. SMITH,
STANHOPE HUDSON.